(12) United States Patent
Cardus Andreu et al.

(10) Patent No.: US 12,384,110 B2
(45) Date of Patent: Aug. 12, 2025

(54) BUILD MATERIAL SUPPLY UNIT

(71) Applicant: Peridot Print LLC, Palo Alto, CA (US)

(72) Inventors: Angels Cardus Andreu, Sant Cugat del Valles (ES); Gabriel De La Cal Mendoza, Sant Cugat del Valles (ES); Gerard Mosquera Donate, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 288 days.

(21) Appl. No.: 17/608,693

(22) PCT Filed: Sep. 18, 2019

(86) PCT No.: PCT/US2019/051737
§ 371 (c)(1),
(2) Date: Nov. 3, 2021

(87) PCT Pub. No.: WO2021/054949
PCT Pub. Date: Mar. 25, 2021

(65) Prior Publication Data
US 2022/0212409 A1    Jul. 7, 2022

(51) Int. Cl.
*B29C 64/321*      (2017.01)
*B29C 64/153*      (2017.01)
(Continued)

(52) U.S. Cl.
CPC .......... *B29C 64/321* (2017.08); *B29C 64/153* (2017.08); *B29C 64/218* (2017.08); *B33Y 10/00* (2014.12); *B33Y 30/00* (2014.12)

(58) Field of Classification Search
CPC ......... B33Y 30/00; B33Y 40/00; B33Y 10/00; B33Y 50/02; B29C 64/153; B29C 64/321;
(Continued)

(56) References Cited

U.S. PATENT DOCUMENTS 5,091,748 A * 2/1992 Morisawa .......... G03G 15/0896
399/281
6,229,976 B1 * 5/2001 Kimura .............. G03G 15/0872
222/DIG. 1
(Continued)

FOREIGN PATENT DOCUMENTS

CN    203635913 U    6/2014
CN    106001565 A    10/2016
(Continued)

*Primary Examiner* — Susan D Leong
*Assistant Examiner* — Jennifer L Groux
(74) *Attorney, Agent, or Firm* — Shook, Hardy & Bacon L.L.P.

(57) ABSTRACT

A 3D printing system build material supply unit includes a tray with an opening that defines a spreading plane in which a recoater spreads build material. A double vane is rotatably mounted inside the tray with the rotation axis extending along the tray below the spreading plane and with each vane having convex front and rear sides. A controller controls rotation of the double vane such as to supply a dose of build material with the front side of one vane to the spreading plane by rotating the double vane into a trimming position in which the front side of the one vane approaches the spreading plane such that the dose of build material is enclosed between the front side of the vane and the spreading plane. Excess build material to be trimmed by the recoater accumulates on the other vane rear side and is lowered into the tray.

15 Claims, 9 Drawing Sheets

(51) Int. Cl.
*B29C 64/218* (2017.01)
*B33Y 10/00* (2015.01)
*B33Y 30/00* (2015.01)

(58) Field of Classification Search
CPC ... B29C 64/329; B29C 64/218; B29C 64/393; B29C 64/205; B29C 64/214; B29C 64/165; B29C 64/241; B29C 64/255; B29C 64/343; B29C 64/307; B29C 64/314; B22F 10/28; B22F 12/50; B22F 12/57; B22F 12/63; B22F 12/67; B22F 12/226; B22F 12/52; B22F 12/60; G03G 15/0865–0898; G03G 15/0087; G03G 15/0089; G03G 15/0891; G03G 2215/0827; G03G 2215/083; G03G 2215/0833; G03G 2215/0836; G03G 2215/0844; B65G 2812/0577; B65G 33/14; B65G 2201/042; B65G 47/16; B65G 65/20; B65G 33/08; B65G 33/30; B65G 2814/0344; G01F 11/24; G01F 11/26; B01F 27/112; B01F 27/1123; B01F 27/70; B01F 27/0727
See application file for complete search history.

(56) References Cited

U.S. PATENT DOCUMENTS

| | | | |
|---|---|---|---|
| 2008/0138513 A1* | 6/2008 | Perret | B22F 12/13 |
| | | | 118/640 |
| 2009/0087226 A1* | 4/2009 | Yamazaki | G03G 15/0872 |
| | | | 399/263 |
| 2014/0363585 A1 | 12/2014 | Pialot et al. | |
| 2015/0224712 A1* | 8/2015 | Tjellesen | B29C 64/40 |
| | | | 425/375 |
| 2015/0298397 A1* | 10/2015 | Chen | B07B 9/00 |
| | | | 209/12.2 |
| 2018/0071985 A1* | 3/2018 | Gimenez Manent | B33Y 40/00 |
| 2019/0039300 A1 | 2/2019 | McKinnell et al. | |
| 2020/0307074 A1* | 10/2020 | Tjellesen | B01F 27/1121 |
| 2022/0009170 A1* | 1/2022 | Tjellesen | B33Y 10/00 |

FOREIGN PATENT DOCUMENTS

| | | |
|---|---|---|
| CN | 206085694 U | 4/2017 |
| CN | 104698981 B | 6/2017 |
| CN | 108790153 A | 11/2018 |
| CN | 109963698 A | 7/2019 |
| EP | 0867248 B1 | 12/2001 |
| EP | 3271141 A1 | 1/2018 |
| EP | 3380305 A1 | 10/2018 |
| JP | 2016-055485 A | 4/2016 |
| JP | 2018193586 A | 12/2018 |
| WO | WO-2015146885 A1 | 10/2015 |
| WO | 2017/005301 A1 | 1/2017 |
| WO | 2017/088897 A1 | 6/2017 |
| WO | WO-2017196326 A1 | 11/2017 |
| WO | 2018/056987 A1 | 3/2018 |

* cited by examiner

BUILD MATERIAL SUPPLY UNIT

CROSS-REFERENCE TO RELATED APPLICATIONS

This application is a U.S. National Stage Application of PCT Application No. PCT/US2019/051737, filed Sep. 18, 2019, entitled "BUILD MATERIAL SUPPLY UNIT," which is incorporated herein by reference.

BACKGROUND

The description is related to a three-dimensional (3D) printing system. A 3D printer uses additive printing processes to make 3D objects from a digital 3D object model file. More particularly, the description is related to a build material supply unit for a 3D printing system to supply build material to the 3D printing system.

BRIEF DESCRIPTION OF THE DRAWINGS

Features of examples will be described, by way of example, in the following detailed description with reference to the accompanying drawings in which like reference numerals correspond to similar, though perhaps not identical, components. For the sake of brevity, reference numerals or features having a previously described function may or may not be described in connection with other drawings in which they appear.

Non-limiting examples will now be described with reference to the accompanying drawings, in which.

DETAILED DESCRIPTION

Figure 1:
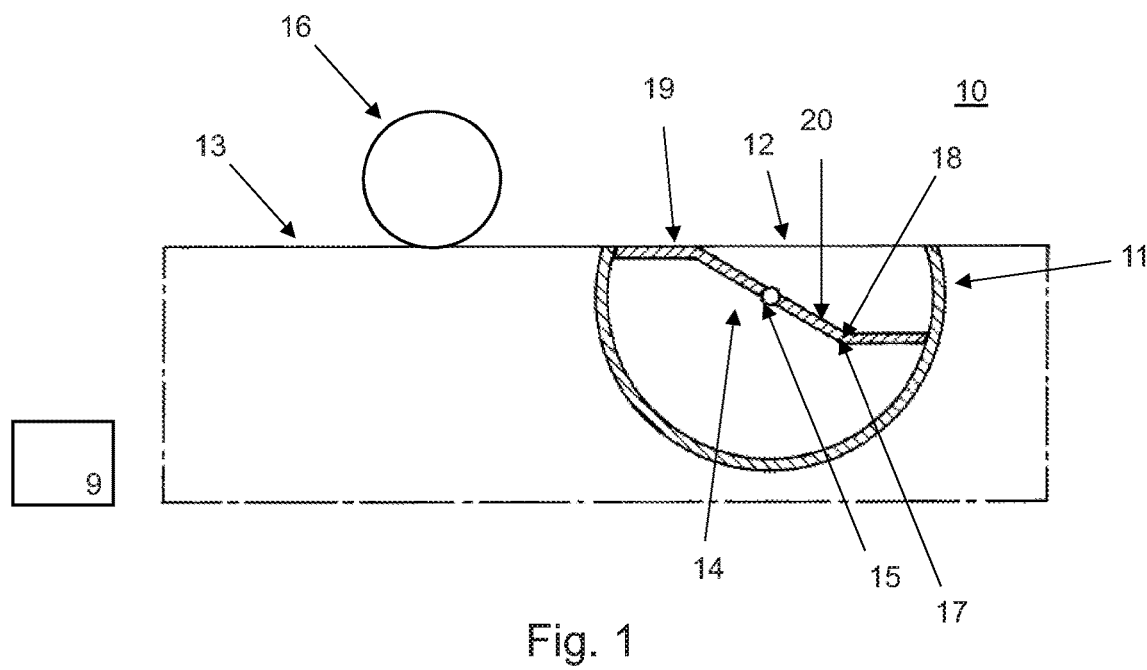
FIG. 1 shows a cross-section of an example of a build material supply unit for a 3D printing system.

In some 3D printing systems, for example, a 3D object may be formed on a layer-by-layer basis where each layer is processed and combined with a subsequent layer until the 3D object is fully formed.

In various 3D printing systems, a 3D object being produced may be defined from a 3D object model file. Information in such a 3D object model file comprises 3D geometric information that describes the shape of the 3D model. The 3D geometric information in a 3D object model file may define solid portions of a 3D object to be printed or produced. To produce a 3D object from a 3D object model, the 3D model information may be processed to provide 2D planes or slices of the 3D model. Each 2D slice generally comprises an image and/or data that may define an area or areas of a layer of build material as being solid object areas where the build material is to be solidified during a 3D printing process.

In some powder-bed 3D printing systems, such as binder or fusing agent jetting systems, a 2D slice of a 3D object model may be produced by spreading a thin layer of build material over a print bed in a build unit of the 3D printing system. This layer of build material is to receive a functional agent such as a binding agent or a fusing agent. Conversely, areas of a build material layer that are not defined as object areas by a 2D slice comprise non-object areas where the build material is not to be solidified and will not receive a functional agent. The procedure of spreading build material and applying a functional agent is repeated until completion of the 3D object. In some such systems, energy, such as curing or fusing energy, may be applied to cause solidification of build material where an agent was applied.

Within 3D printing systems, the term "build material" is to be generally understood as a physical substance that can be used to generate an object via 3D printing. Examples of build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide (e.g., nylon), thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, and plastics/ceramics blends. There exist more build materials and blends of build materials that can be managed by an apparatus of this disclosure. In some 3D printing systems, the build material is in powder form. In other 3D printing systems, the build material is in the form of paste material, solid material, slurry material or liquid material.

Some 3D printing systems may comprise, among others, a build platform, a build material storage, a printhead to apply the functional agent to the build material, a recoater, a control unit, a build material supply unit, and a user interface. In one example, the build material supply unit may be integrated into the build unit of the 3D printing system. In another example, a build unit may comprise one or multiple build material supply units. In one example, the 3D object may be generated on a build platform by alternatively applying a build material and a functional agent (and energy, where appropriate). In one example, the build material may be applied layer wise by the recoater moving in a spreading plane. In an example initial state, the spreading plane and the build platform may coincide, while the build platform may move downwards with increasing number of applied layers of build material.

In example 3D printing systems that use powdered material, the powdered material may be conveyed from a powder storage unit to a build material supply unit and then to the build platform, located next to the build material supply unit, and on which a 3D object is build layer by layer. An example build material supply unit provides a predetermined dose of build material, which is an amount of powder sufficient to form a layer on the build platform. The example build material supply unit may distribute the predetermined dose of build material uniformly along the length of the build platform. A recoater may spread the supplied build material across the build platform. The build material supply unit may as well reduce powdery build material that becomes airborne during the supplying. An example build material unit is further easy to dismantle for cleaning.

Examples described relate to a mechanism that distributes build material from a build material inlet to a uniform, linear output for supplying to a build platform of a 3D printing system while minimizing airborne build material. In addition, the example apparatus described herein reduces the number of active parts because the mechanism has dosing and distributing functions, both of which are carried out during rotation of the mechanism. As such, the example build material supply unit is a simplified design and is compatible with a continuous feeding strategy, whereby material is continually input into the spreading plane, and the example 3D printing system can produce a dose of powder in a reduced time, increasing productivity. In addition, the simplified design reduces the number of failure modes, improving reliability and up time of the 3D printing system. Examples described herein may relate to binder jetting and other powder-bed 3D printing systems.

FIGS. 1-11 show a build material supply unit 10 of a 3D printing system and related methods wherein like reference numerals correspond to the same components. Now referring to FIG. 1 which shows a cross-section of the build material supply unit 10 for a 3D printing system. The build material supply unit 10 comprises a tray 11. The tray 11 comprises a build material supply opening 12. The build material supply opening 12 defines a spreading plane 13 in which a recoater 16 of the 3D printing system spreads build material. The spreading plane coincides with the build platform of the 3D printing system in an initial state, joined together along a single edge. The build material supply unit 10 further comprises a double vane 14 that is rotatably mounted inside the tray 11. The rotation axis 15 of the double vane 14 extends along the tray 11 below the spreading plane 13. Each vane of the double vane 14 has a convex front side 17 and a rear side 18.

The build material supply unit 10 also comprises a controller 9 to control the rotation of the double vane 14. By rotating the double vane 14 into a trimming position, shown in FIG. 6c, a predetermined dose of build material with the front side 17 of one vane 19 of the double vane 14 is supplied to the spreading plane 13. In the trimming position, the front side 17 of the one vane 19 approaches the spreading plane 13 such that the predetermined dose of build material is enclosed between the front side 17 of the one vane 19 and the spreading plane 13. In the trimming position, the recoater 16 of the 3D printing system trims excess build material on the front side of the one vane 19 to the rear side 18 of the other vane 20. The one vane 19 of the double vane and the other vane 20 of the double vane may be aligned in the same sense of rotation along which they are offset by an angle of 180 degrees. Thus, with half a turn of the double vane, the one vane 19 takes over the functions of the other vane 20 and vice versa. Excess build material may comprise the amount of build material loaded on the front side 17 of the one vane 19 that exceeds the predetermined dose of build material. In some examples, the double vane 14 may be rotated in a single direction. This direction may determine the front side 17 and the rear side 18 of a vane as seen from the rotating direction. The excess build material trimmed to the rear side 18 of the other vane 20 will be lowered into the tray 11 upon further rotation of the double vane 14. In some examples, the predetermined dose of build material may be in the order of a few grams of build material. In some examples, predetermined dose of build material may be one of the following: 6 grams, 8 grams, 10 grams, 12 grams, 14 grams, and 16 grams.

In an example, the tray 11 may comprise a circular cross-section below the spreading plane. The semi-circular of the tray 11 may be arranged to the evolvent of the rotating double vane 14 below the spreading plane 13. The distance between the rotation axis 15 of the double vane 14 to the build material supply opening 12 may be adopted to avoid interference of the recoater 16, which moves within the spreading plane 13, with the double vane 14 in the trimming position shown in FIG. 6c or in the supply position shown in FIG. 6e?. In an example material supply unit 10, the distance between the rotation axis 15 of the double vane 14 to the build material supply opening 14 may be in the order of about ten millimeters.

An example double vane 14 may comprise a double bent blade. Yet another example double vane 14 may be a sheet metal with two parallel longitudinal bends. In some examples, the double vane 14 may be made of stainless-steel. In another example, the double blade 14 may be made of aluminum. In yet another example, the double vane 14 may be made of a metal other than aluminum or stain-less steel. In further examples, the double vane may be made of a material that comprises a certain sturdiness. The double vane 14 may be easily replaceable and easy to clean. The double vane 14 may be arranged to meet the requirements of a certain printing process. It represents a robust system for dosing and feeding build material to a 3D printing system.

The example double vane 14 may comprise two vanes. In one example, the vanes of the double vane 14 are aligned in the same sense of rotation along which they are offset by an angle of 180 degrees. In another example, the double vanes are offset by an angle different from 180 degrees. In one example, the convex front side 17 of a vane of the double vane 14 may be formed in a curved shape. In another example, the convex front side 17 of the one vane of the double vane 14 may be angularly bent. In yet another example the convex front side 17 of the double vane is rather slightly bent such with a shallow angle of curvature. In some examples, the double vane may comprise a number of vanes that is greater than two. In some other examples, the double vane may comprise an even number of vanes.

In some examples, the rear side 18 of the other vane of the double vane 14 may be concave. In other examples, the rear side 18 of the other vane of the double vane 14 may be flat. In yet other examples, the surface of the rear side 18 of the double vane 14 may be ripped or bent. The rear side of the vane helps reduce the amount of powder that becomes airborne by decreasing the height that the build material falls freely into the tray 11 after trimming. Without the rear side 18 of the other vane 20 the build material would freely fall down to the bottom of the tray along a distance corresponding to the diameter of the vane. The "other" vane prevents or at least strongly reduces this free fall to a slipping down around double the distance between the rotation axis and the spreading plane. The height of the rotation axis 15 of the double vane 14 with respect to the spreading plane 13 may be arranged to further avoid the development of airborne build material.

In some examples, the recoater 16 may be a roller. In other examples, the recoater 16 may be a counter-rotating roller. In another example, the recoater 16 may be a slider or blade. In some examples, the recoater 16 may comprise a carriage to move the recoater 16. The recoater 16 may be arranged to move over the build material supply opening 12. An example 3D printing system may comprise more than one recoater 16. In another example, for a 3D printing system comprising two parallel build material supply units 10, the recoater 16 may move across a printing platform in a first direction to deposit a first layer of powder from one build material supply unit 10 on one side of the build platform and then moves in a second, opposite, direction to deposit another layer of powder from a second build material supply unit 10 on the other side of the build platform.

In some examples, a 3D printing system may comprise one build material supply unit 10 located next to the build platform. In another example, a 3D printing system may comprise two or more build material supply units 10 located next to the build platform. In an example 3D printing system, the at least one build material supply unit 10 may be arranged to minimize the travel distance of the build material from the build material supply unit 10 to the build platform.

Figure 2:
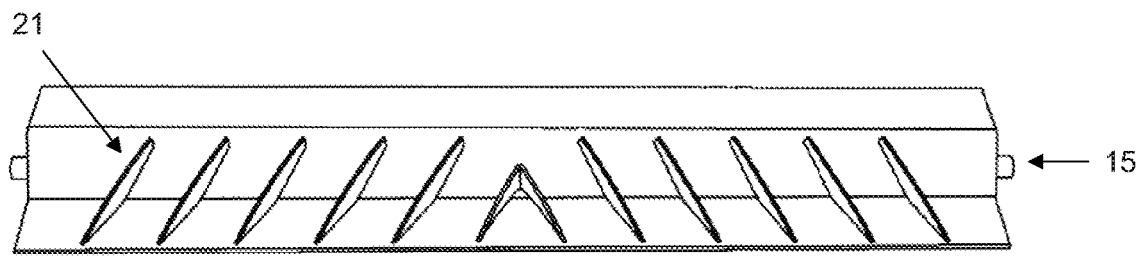
FIG. 2 shows a side view of a double vane of an example build material supply unit for a 3D printing system.

FIG. 2 shows a side view of an example double vane 14 of an example build material supply unit 10 for a 3D printing system. The build material supply unit 10 may comprise deflectors 21 to uniformly distribute build material which is accumulated on the rear side 18 of the vanes of the double vane 14 over the length of the tray 11. The tray 11 extends along the rotation axis 15 of the double vane 14.

In some examples, the deflectors 21 are provided on the rear side 18 of the other vane and the convex front side 17 of the one vane of the double vane 14. The double vane 14 may be arranged such that the deflectors 21 extend from the rear side 18 of one vane 19 partly to the convex front side 17 of the other vane 20. In some examples, the deflectors 21 are inclined with respect to the rotation axis 15 of the double vane 14 such as to distribute build material accumulated in the trimming position on the rear side 18 of one vane 19 over the length of the tray 11 upon trimming of excess build material and upon further rotation of the double vane 14.

In some examples, the deflectors 21 of the double vane 14 may be regularly spaced along the rotation axis 15 of the double vane 14. In this way, the build material accumulated by the rear side 18 of the vane and guided by the deflectors 21 is evenly distributed along the length of the tray 11.

Figure 3:
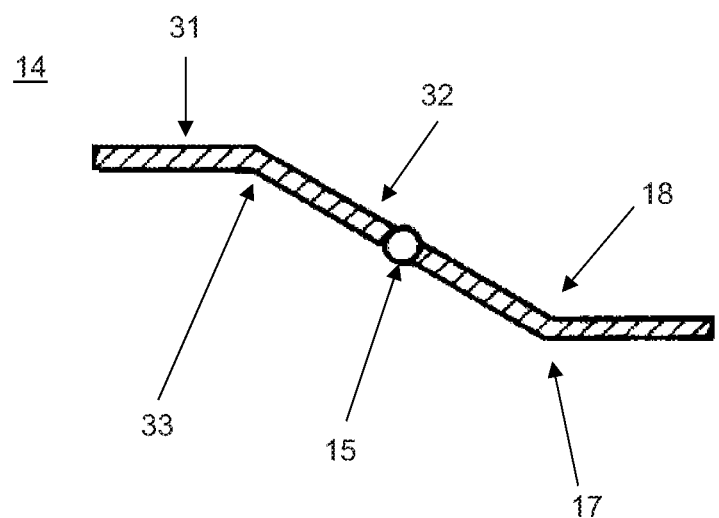
FIG. 3 shows a cross-section of a double vane of an example build material supply unit for a 3D printing system.

FIG. 3 shows a cross-section of an example double vane 14 of an example build material supply unit 10 for a 3D printing system. An example double vane 14 may have a z-profile. The z-profile may comprise two parallel outer sections 31. Both outer section 31 may be connected to a central double vane section 32 via an elbow 33 as shown in FIG. 3. In some examples, the elbow 33 may be a longitudinal bending edge. In one example, the longitudinal bending edge may be a rounded edge. In another example, the longitudinal bending edge may be a sharp edge transition between the outer double vane sections 31 and the central double vane section 32.

In one example, the z-profile may be arranged such that the predetermined dose of build material may be enclosed between the spreading plane 13 and one outer double vane section 31 when the double vane 14 is rotated into the trimming position. In the trimming position, the elbow 33 approaches the spreading plane 13. In one example, the elbow 33 may come close to the spreading plane 13 from below in the trimming position. In another example, the elbow may connect the spreading plane 13 in the trimming position. In yet another example, the elbow 33 may align with the spreading plane 13 in the trimming position.

In some examples, the predetermined dose of build material sets boundary conditions for configuring the bending angle of the elbow 33 and, in dependence of the angle, for the length of the outer section 31 in the trimming position. In another example, the predetermined dose of build material sets boundary conditions for configuring the length of the outer section 31, and in dependence of the outer section, for the bending angle of the elbow 33 in the trimming position. The resulting z-shape may determine the distance between the rotation axis 15 and the spreading plane 13. In another example, the distance between the rotation axis 15 and the spreading plane 13 may determine the z-shape of the double vane 14 under consideration the predetermined dose of build material.

Figure 3A:
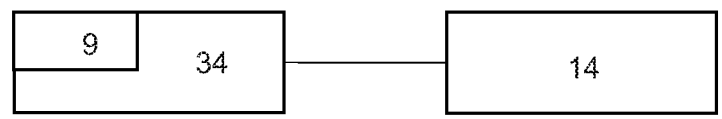
FIG. 3a schematically presents a controller which controls the double vane.

FIG. 3a schematically presents the controller 9 of the build material supply unit 10 which controls rotation of the double vane 14 by a driving system 34. The controller 9 may control rotation speed of the double vane 14. The controller 9 may control the angular position of the double vane 14 in the trimming and the supplying position. The controller 9 may further synchronize the movement of the recoater 16 and the rotation of the double vane 14.

Figure 4:
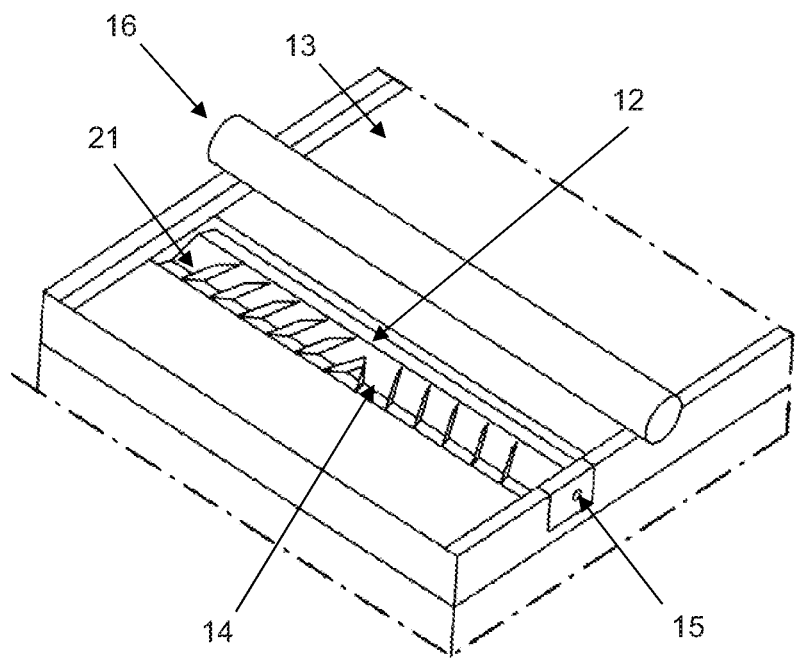
FIG. 4 shows a perspective view of an example of a build material supply unit for a 3D printing system.

FIG. 4 shows a perspective view of an example of a build material supply unit 10 for a 3D printing system. In one example, the double vane 14 is mounted with its rotation axis 15 below the spreading plane 13. The distance between the rotation axis 15 of the double vane 14 to the build material supply opening 12 may be designed such that in the trimming position, the bending edge 33 of the double vane approaches the spreading plane 13 and prevents build material of the enclosed predetermined dose of build material to be moved by the recoater to the other vane 20. The recoater 16 may be arranged to move across the build material supply opening 12. The deflectors 21 may redirect the falling excess build material towards the lateral ends of the tray 11 such that the build material supply unit 10 supplies the predetermined dose of build material uniformly along the spreading plane 13.

Figure 5:
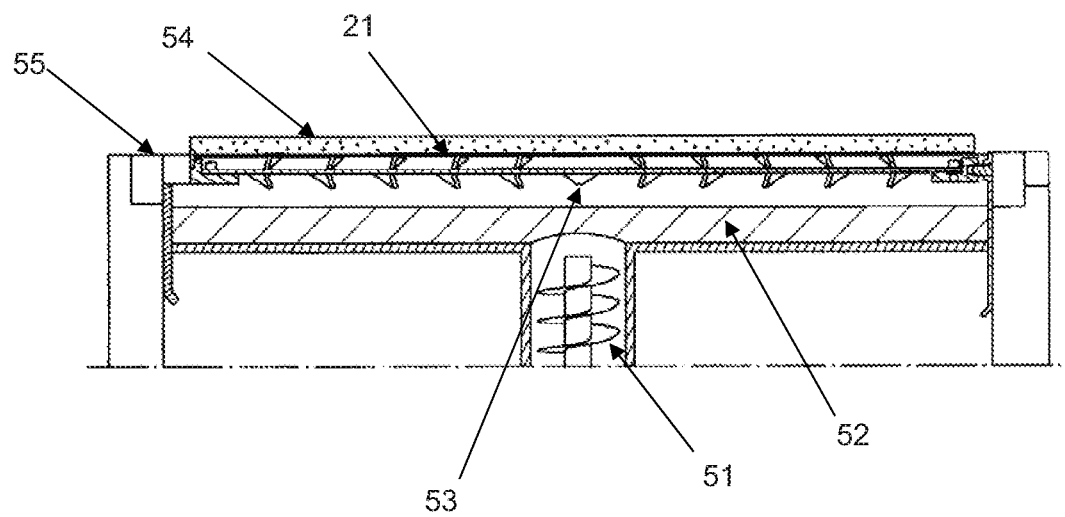
FIG. 5 shows a side view of an example of a build material supply unit for a 3D printing system.

FIG. 5 shows a side view of an example of a build material supply unit 10 for a 3D printing system. In some examples, the build material supply unit 10 may comprise a thermal blanket 52. The thermal blanket 52 may surround the tray 11 to control the temperature of the build material which is accumulated in the tray 11. In some examples, the thermal blanket 52 may preheat the build material which may cause the build material to become sticker or more cohesive. In some examples, preheating the build material may cause the build material to form a semi-hard cake once supplied to the spreading plane 13.

In some examples, the build material supply unit 10 may comprise a build material inlet 53. The build material inlet 53 may be coupled to a build material feeder 51, wherein the build material feeder 51 may feed build material through the build material inlet 53 into the tray 11. The build material feeder 51 may feed build material from a build material storage of the 3D printing system through the build material inlet 53 into the tray 11. In one example, the build material inlet 53 may be located at the bottom of the tray 11 opposite the build material supply opening 12. In some examples, the build material inlet 53 is located centrally along the rotation axis 15 of the double vane 14. The amount of build material fed by the build material feeder 51 in one cycle may be synchronized to correspond to the predetermined dose of build material supplied to the spreading plane 13 in one cycle.

In one example, the build material supply unit 10 may comprise a plurality of material inlets 53. In some examples, the deflectors 21 of the double vane 14 may be arranged to the configurations of the build material inlet 53 in the tray 11 such that the deflectors 21 distribute build material uniformly along the tray 11. In one example the tray 11 may comprise two build material inlets 53 which divide the tray 11 into two sections. The deflectors 21 of the double vane 14 corresponding to the first section may be inclined towards the build material inlet 53 of the first section whereas the deflectors 21 of the double vane 14 corresponding to the second section may be inclined to the build material inlet of the second section respectively.

The build material may be fed through the build material inlet 53 into the tray 11 by a feeder 51. In another example, the feeder 51 may comprise a pneumatic conveyance system. In another example, the feeder 51 may comprise an auger. In yet another example, the feeder 51 may comprise an Archimedes screw.

Before the build material unit 10 may be operated in steady state, it may undergo an initialization. During initialization, the double vane 14 may rotate some full turns to uniformly distribute build material within the tray 11 while the recoater 16 is on hold. In steady state, the build material supply unit 10 may supply the predetermined dose of build material for building one layer of a 3D object uniformly along the spreading plane 13. The build material feeder 51 may be synchronized to feed the predetermined dose of build material into the tray 11 such that the build material level in the tray 11 is maintained at steady state.

In some examples, the configuration of the deflectors 21 may determine the speed at which build material is distributed along the tray 11. In one example, the length of the deflectors 21 may determine the distance the build material travels along the tray 11 during rotation. In another example, the size of the deflectors 21, the angle the deflectors 21 are tilted with regards to the rotation axis as well as the distance between deflectors 21 may determine the amount of powder that is redirected towards the longitudinal ends of the tray 11 during rotation. In some examples, the deflectors may be arranged to meet the build material characteristics.

In some examples, the sense of orientation of the deflectors 21 is modified to the build material inlet 53. In an example, where build material is supplied over the length of the tray 11, the deflectors may not be inclined but still arranged on the double vane to comb through the build material to avoid conglomerating of build material. In another example, where build material is supplied over the length of the tray 11, the double vane 14 may not comprise deflectors 21. In an example of a central build material inlet, the deflectors may be oriented symmetrically with respect to the build material inlet. In some examples, stickier powder may require enhanced height of deflectors for distribution to counteract fins that may otherwise occur when sticky powder hits deflectors.

FIG. 5 further shows an example predetermined dose of build material 54 being supplied at the build material supply opening 11 of the build material supply unit 10. The predetermined dose of build material 54 will be spread into the spreading plane 13 by the recoater 16 which moves over the build material supply unit 10.

In some examples, the build material supply unit 10 may further comprise a collecting unit 55. The collecting unit 55 may be positioned at least at one longitudinal end of the tray 11 and arranged to collect excess build material. In some example, the collecting unit 55 may be a removable storage. In some examples, the build material collected in the collecting unit 55 may be processed for reuse. The build material unit 10 may be arranged to minimize build material that is collected in the collecting unit 55.

An example build material supply unit 10 may also comprise a controller 9. The controller 9 may be programmed to measure the amount of build material loaded on the front side 17 of one vane 19. The amount of build material loaded on the front side 17 of one vane 19 may be measure for example by measuring the torque applied to the double vane 14. In some examples, the torque to be applied to the double vane 14 may be measured using pulse-width modulation. In some examples, this measurement indicates the level of build material in the tray 11. In another example, the level of build material in the tray 11 may be measured using laser measurement. The amount of build material supplied by the build material feeder 51 may be controlled closed-loop as a response of the measured level of build material in the tray 11.

An example build material supply unit 10 may comprise a driving system 34 to rotate the double vane 14. In one example, the driving system 34 may comprise a motor and the controller 9. The controller 9 may further comprise an encoder to control the rotation angle of the double vane 14. The driving system 34 may also comprise a gearbox to increase torque applied to the rotating axis 15. The driving system 34 may also comprise a coupling that enables dislodging the double vane 14 from the tray 11 for maintenance and cleaning. In some examples, the build material supply unit 10 may further comprise a locking system arranged at the opposite side of the driving system to preload the double vane against the driving system axial datum.

In an example of the build material supply unit 10 the controller 9 may actuate the driving system 34. In an example, the controller 9 may also measure the level of build material in the tray 11.

Figure 6:
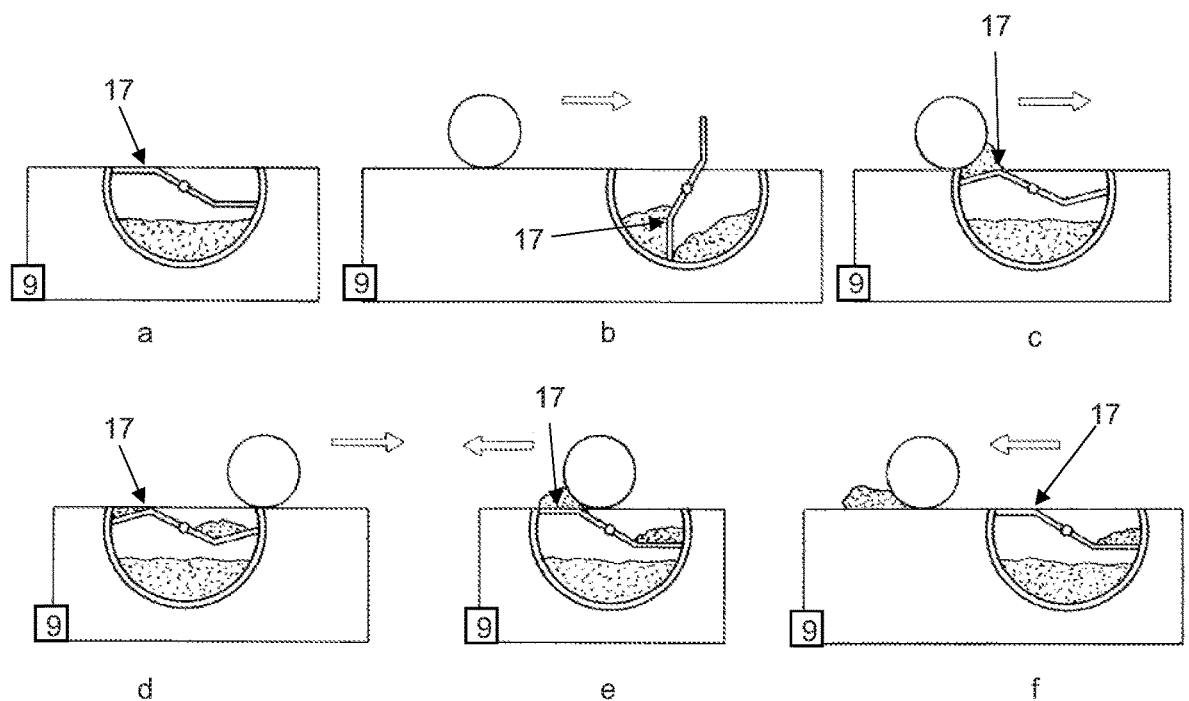
FIG. 6-11 show examples of a method for supplying build material from a tray of a build material supply unit to a spreading plane in a 3D printing system.

FIG. 6 shows how the controller 9 controls example positions of the double vane 14 and the recoater 16 during one cycle. In some examples, one cycle may correspond to a half turn of the double vane 14. FIG. 6a shows a state of the build material supply unit 10 after initialization. During initialization, the controller 9 may rotate the double vane 14 a predetermined number of full turns to uniformly distribute the build material within the tray 11 while halting the recoater 16. The predetermined number of full turns may depend on the arrangement of the deflectors 21 on the double vane 14. In an example, the deflectors 21 may be spaced apart and inclined with respect to the rotation axis 15 such that the build material reaches the next adjacent deflector in outwardly longitudinal direction during a half turn. The number of full turns during initialization may correspond to at least one quarter of the total number of deflectors 21.

As the build material has been distributed uniformly along the longitudinal axis of the tray 11 the double vane is ready for operation. The controller 9 controls the build material feeder 51 to supply the predetermined dose of build material through the build material inlet to the tray 11 from a build material storage in each cycle. Upon rotation, the double vane 14 may be controlled by the controller 9 to load a portion of build material on the convex front side 17 of one vane 19, while the recoater 16 may be controlled by the controller 9 to move from the build platform towards the tray 11 as shown in FIG. 6b. In one example position of the double vane 14, the controller 9 may further rotate the double vane may until one elbow 33 of the vane aligns with the spreading plane 13 as shown FIG. 6c. In this position, the vane encloses the predetermined dose of build material to be fed to the spreading plane 13 between its convex front side 17, the spreading plane 13 and the inner side section of the tray 11 below the spreading plane 13. In this trimming position, the controller 9 may halt double vane 14 until excess build material has been trimmed and the controller 9 may have moved recoater 16 across the tray.

The controller 9 may continue to move the recoater towards a direction away from the build platform thereby trimming excess build material. The recoater 16 relocates excess build material such that it is accumulated on the rear side 18 of the other vane as shown in FIG. 6d. The rear side of the other vane 20 catches the excess build material. Free fall of the excess build material into the tray 11 and related airborne build material is thus avoided.

FIG. 6e shows the controller 9 to further rotate the double vane 14 until the outer section of the one vane 19 aligns with the spreading plane 13 and the predetermined dose of build material is lifted to the spreading plane 13. The controller then moves the recoater 16 in a opposite direction towards the build platform and which spreads the predetermined dose of build material into the spreading plane 13 as shown in FIG. 6f. Upon further rotating the double vane 14 by the controller 9, excess build material is lowered into the tray 11 by the other vane 20. In some examples, the predetermined dose of build material may be slightly modified in that the controller 9 halts the double vane 14 at different angles in the trimming and supplying position.

The controller 9 may synchronize the movement of the recoater 16 and the rotation of the double vane 14 may such that the recoater 16 does not interfere with the double vane 14. Also, the height of the double vane 14 may be arranged such that outer sections 31 and the elbows 33 do not interfere with the recoater 16.

Figure 7:
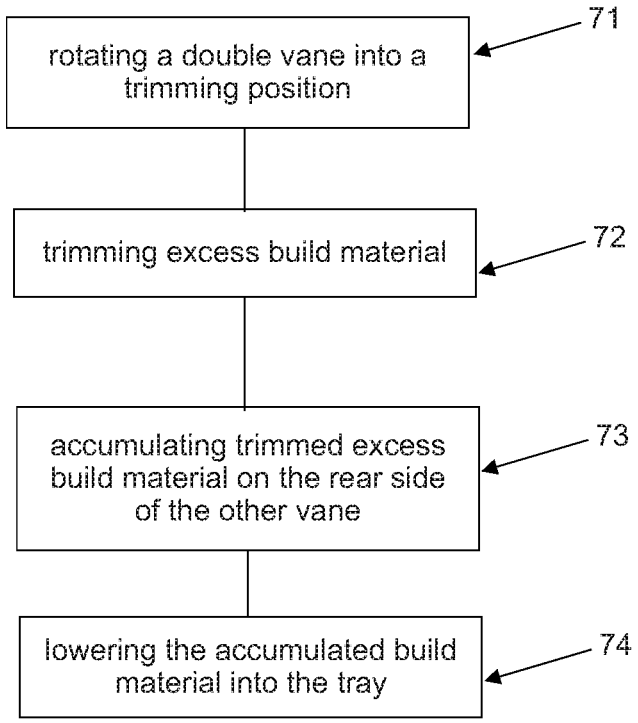

FIG. 7 shows a method 70 performed by the controller 9 to control rotation of the double vane 14 and movement of the recoater 16 for supplying build material from the tray 11 of the build material supply unit 10 to the spreading plane 13 in a 3D printing system. In block 71, the controller 9 rotates the double vane 14 in a trimming position. Upon rotation by the controller 9, the double vane 14 lifts build material with the front side 17 of one vane 19 from the tray 11 into the trimming position where a predetermined dose of build material is enclosed between the front side 17 of the one vane 19 and the spreading plane 13.

In block 72 the controller 9 controls the recoater 16 to trim excess build material loaded on the front side 17 of the one vane 19. The controller 9 moves the recoater 16 for this in the spreading plane 13 from the front side 17 of the one vane 19 to the rear side 18 of the other vane 20. The method 70 further comprises accumulating excess build material that has been trimmed by the recoater 16 on the rear side 18 of the other vane 20 of the double vane 14 in block 73. The method 70 comprises the controller 9 to further rotate the double vane 14 thereby lowering the build material which has been accumulated on the rear side 18 of the other vane 20 into the tray 11 in block 74.

In one example, the controller 9 controls the rotation speed of the double vane which corresponds to the lowering speed of lowering accumulated excess build material on the rear side 18 of the other vane 20 into the tray 11 to prevent free fall of excess build material into the tray 11. The rear side 18 of the other vane 20 gently lowers excess build material into the tray which prevents build material becoming airborne within the build material supply unit 10. In some examples, the development of airborne build material may cause malfunctioning of parts of the 3D printing system. In other examples, the development of airborne build material may reduce the life-time of parts of the 3D printing system.

Figure 8:
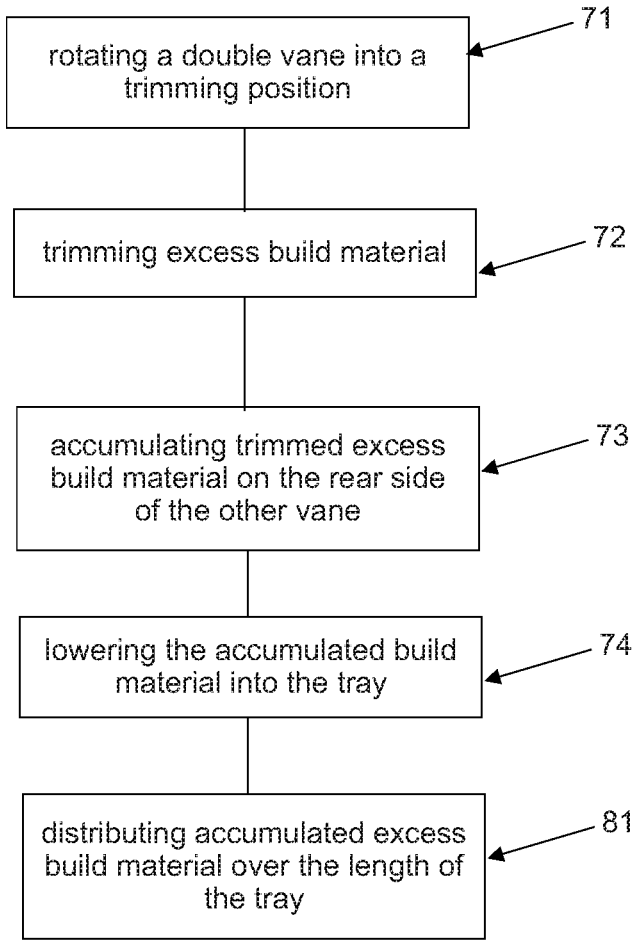

FIG. 8 shows a further example method 80 performed by the controller 9 to control rotation of the double vane 14 and movement of the recoater 16 for supplying build material from the tray 11 of the build material supply unit 10 to the spreading plane 13 in a 3D printing system. The controller 9 may rotate the double vane 14 such that excess build material accumulated on the rear side 18 of the other vane 20 is distributed over the length of the tray 11 by means of deflectors 21 provided on the double vane 14 in block 81. In one example, blocks 74 and 81 are processed by the same rotation of the double vane 14. The controller 9 may further lower the other vane 20 of the double vane 14 by such that the excess build material is deflected by the deflectors and put into the tray. The deflectors may describe the movement of the excess build material.

Figure 9:
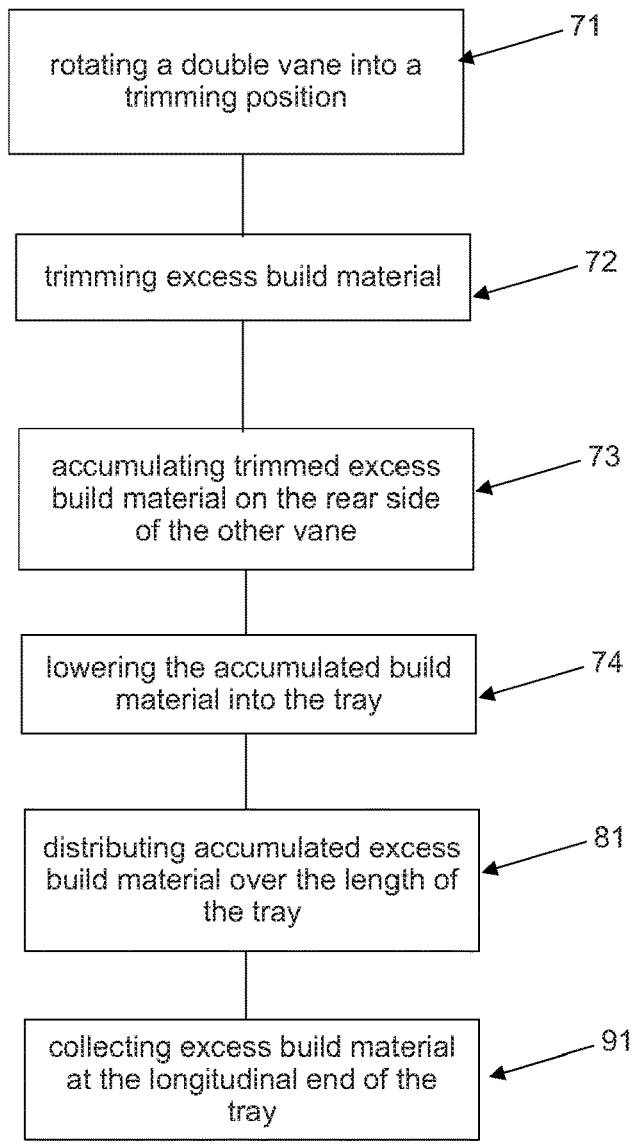

FIG. 9 shows an example method 90 performed by the controller 9 to control rotation of the double vane 14 and movement of the recoater 16 for supplying build material in a 3D printing system. In some examples, the method 90 may comprise collecting excess build material at the longitudinal end of the tray in block 91. In some examples, excess build material may be processed for reuse.

Figure 10:
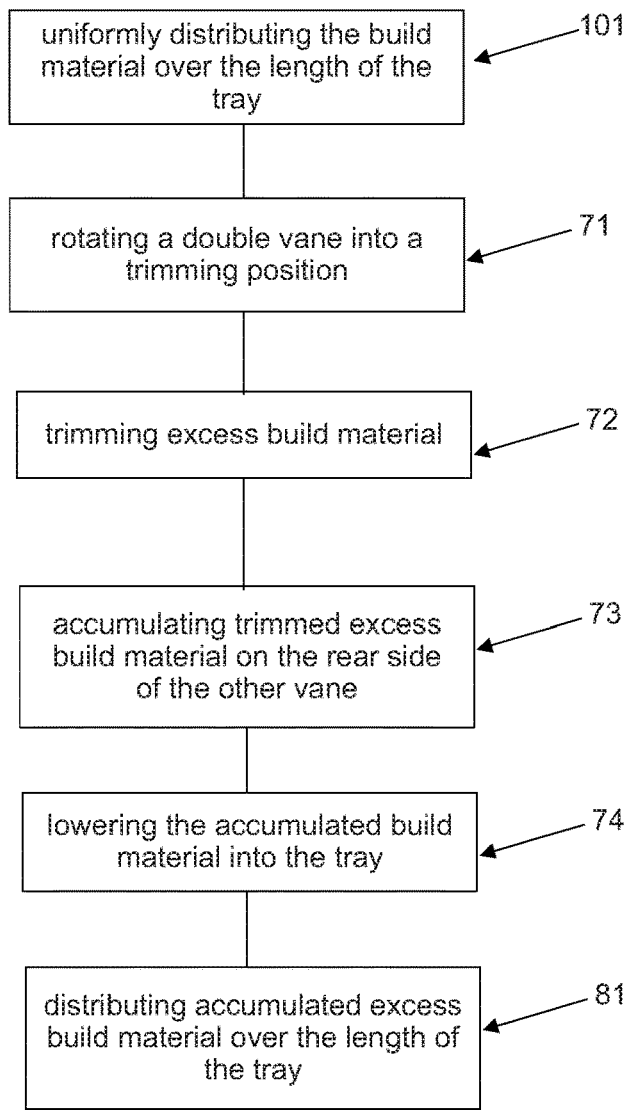

FIG. 10 also shows an example method 100 performed by the controller 9 to control rotation of the double vane 14 and movement of the recoater 16 for supplying build material in a 3D printing system. The controller 9 may rotate the double vane 14 a predetermined number of rotations to uniformly distribute the build material over the length of the tray 11. The predetermined number of rotations may result from the arrangement of the deflectors 21 on the double vane 14. The double vanes 21 may be spaced apart and inclined with respect to the rotation axis 15 such that build material reaches the next adjacent deflector in outwardly longitudinal direction during a half turn. The number of full turns during initialization may correspond to at least one quarter of the total number of deflectors 21.

Figure 11:
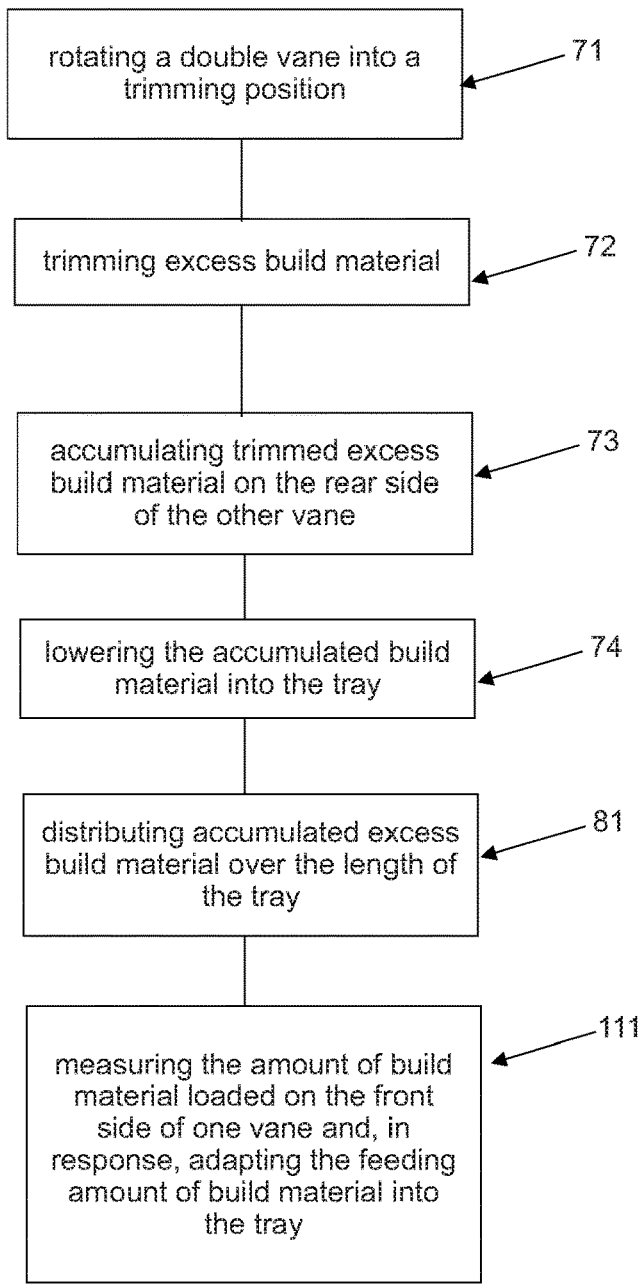

FIG. 11 shows a further example method 110 performed by the controller 9 to control rotation of the double vane 14 and movement of the recoater 16 for supplying build material in a 3D printing system. In this method, the controller 9 may measure the amount of build material loaded on the front side 17 of one vane 19 and may adapt the feeding amount of build material a feeder feeds through a build material inlet into the tray 11 in response to the measured amount of build material in block 111.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents.

It should be noted that the above-mentioned examples illustrate rather than limit what is described herein, and that those skilled in the art will be able to design many alternative implementations without departing from the scope of the appended claims. Features described in relation to one example may be combined with features of another example.

What is claimed is:

1. A build material supply unit for a 3D printing system, the build material supply unit comprising:
    a tray comprising a build material supply opening that defines a spreading plane in which a recoater of the 3D printing system spreads build material; and
    a double vane comprising a first vane and a second vane rotatably mounted inside the tray with a rotation axis extending along the tray below the spreading plane and with each vane having a convex front side and a rear side, wherein the first vane and the second vane each comprises a deflector on the rear side to distribute excess build material accumulated on the corresponding rear side over a length of the tray, and
    a controller, wherein the controller is to rotate the double vane;
    into a trimming position in which the front side of the first vane approaches the spreading plane such that a predetermined dose of build material loaded on the front side is enclosed between the front side of the first vane and the spreading plane and in which excess build material is to be trimmed by the recoater in a first pass will be accumulated on the rear side of the second vane and lowered into the tray upon further rotation of the double vane; and into a supplying position in which the predetermined dose of build material is supplied with the front side of the first vane substantially in plane with the spreading plane to be spread by the recoater in a second pass over the spreading plane.

2. The build material supply unit according to claim 1, wherein the deflectors distribute excess build material accumulated on the rear side of the second vane over a length of the tray during the first pass of the recoater and rotation of the double vane.

3. The build material supply unit according to claim 1, wherein the double vane has a z-profile comprising two outer sections each being connected to a central double vane section via a corresponding elbow, wherein the z-profile is such that the predetermined dose of build material is enclosed between the spreading plane and a first outer section when the first outer section is rotated into the trimming position with the corresponding elbow connecting the first outer section to the central double vane section approaching the spreading plane.

4. The build material supply unit according to claim 3, wherein the deflectors are provided on the convex front side of each of the first vane and the second vane by extending from the rear side of the second vane and the first vane partly to the convex front side of the first vane and the second vane, respectively, wherein the deflectors are inclined with respect to the rotation axis of the double vane to distribute build material accumulated in the trimming position on the rear side of the first vane over a length of the tray upon trimming of excess build material and upon further rotation of the double vane.

5. The build material supply unit according to claim 4, wherein during an initialization phase the controller is to rotate the double vane for a predetermined number of turns to uniformly distribute the build material over the length of the tray, wherein the predetermined number depends on an arrangement of the deflectors on the double vane.

6. The build material supply unit according to claim 1, wherein the tray comprises a build material inlet coupled to a build material feeder to feed build material through the build material inlet into the tray.

7. The build material supply unit according to claim 1, wherein the controller is programmed to measure a torque employed to rotate the double vane, which indicates an amount of build material loaded on the front side of the first vane and to adapt a feeding amount of build material fed by a build material feeder in response to the measured amount of build material.

8. The build material supply unit according to claim 1, further comprising a collecting unit positioned at at least one longitudinal end of the tray to collect excess build material.

9. Method for supplying build material from a tray of a build material supply unit to a spreading plane in a 3D printing system, comprising of:

rotating a double vane comprising a first vane and a second vane, which is rotatably mounted inside the tray with a rotation axis extending along the tray below the spreading plane and with each vane having a convex front side and a rear side, to lift build material with the front side of the first vane from the tray into a trimming position where a predetermined dose of build material is enclosed between the front side of the first vane and the spreading plane, trimming excess build material loaded on the front side of the first vane with a recoater which is moved in the spreading plane from the front side of the first vane to the rear side of the second vane, accumulating trimmed excess build material on the rear side of the second vane, further rotating the double vane into a supplying position in which the predetermined dose of build material is supplied to the spreading plane, distributing excess build material accumulated on the rear side of the second vane over a length of the tray by means of deflectors provided on the rear side of the first vane and the rear side of the second vane, spreading the predetermined dose of build material with the recoater over the spreading plane, and lowering the build material accumulated on the rear side of the second vane into the tray by further rotation of the double vane.

10. The method for supplying build material in a 3D printing system according to claim 9, wherein the deflectors distribute the excess build material accumulated on the rear side of the second vane over the length of the tray during a first pass of the recoater and rotation of the double vane.

11. The method for supplying build material in a 3D printing system according to claim 10, further comprising collecting excess build material at a longitudinal end of the tray.

12. The method according to claim 10, further comprising rotating the double vane for a predetermined number of turns during an initialization phase to uniformly distribute the build material over the length of the tray.

13. The method according to claim 10, further comprising:

measuring an amount of build material loaded on the front side of the first vane; and adapting a feeding amount of build material fed by a build material feeder through a build material inlet into the tray in response to the measured amount of build material.

14. The double vane for a build material supply unit according to claim 1, wherein the double vane has a z-profile comprising two outer sections each being connected to a central double vane section via a corresponding elbow, wherein the z-profile is such that the predetermined dose of build material is enclosed between the spreading plane and an outer double vane section when the double vane is rotated into the trimming position with the corresponding elbow connecting the outer double vane section to the central double vane section approaching the spreading plane.

15. The double vane according to claim 14, further comprising the deflectors being on the convex front side of each of the first vane and the second vane by extending from the rear side of the second vane and the first vane partly to the convex front side of the first vane and the second vane, respectively, wherein the deflectors are inclined with respect to the rotation axis of the double vane.

* * * * *